United States Patent
Konzelmann et al.

(10) Patent No.: US 6,854,325 B2
(45) Date of Patent: Feb. 15, 2005

(54) SENSOR CHIP HAVING POTENTIAL SURFACES FOR AVOIDING CONTAMINANT

(75) Inventors: Uwe Konzelmann, Asperg (DE); Torsten Schulz, Leinfelden-Echterdingen (DE)

(73) Assignee: Robert Bosch GmbH, Stuttgart (GB)

( * ) Notice: Subject to any disclaimer, the term of this patent is extended or adjusted under 35 U.S.C. 154(b) by 0 days.

(21) Appl. No.: 10/311,404

(22) PCT Filed: Apr. 17, 2002

(86) PCT No.: PCT/DE02/01424
§ 371 (c)(1),
(2), (4) Date: Mar. 14, 2003

(87) PCT Pub. No.: WO02/084226
PCT Pub. Date: Oct. 24, 2002

(65) Prior Publication Data
US 2003/0159505 A1 Aug. 28, 2003

(30) Foreign Application Priority Data
Apr. 18, 2001 (DE) ........................ 101 18 781

(51) Int. Cl.$^7$ ................................ G01F 1/68
(52) U.S. Cl. ................................ 73/204.17
(58) Field of Search ............ 73/204.11–204.27

(56) References Cited

U.S. PATENT DOCUMENTS

| | | |
|---|---|---|
| 4,294,114 A | 10/1981 | Lauterbach |
| 4,468,963 A | 9/1984 | Schäuble |
| 4,888,988 A | 12/1989 | Choi et al. |
| 4,947,688 A | 8/1990 | Yagawara et al. |
| 5,158,801 A | 10/1992 | Hopson, Jr. et al. |
| 5,404,753 A | 4/1995 | Hecht et al. |
| 5,538,692 A * | 7/1996 | Joannou ................ 422/121 |
| 5,705,745 A * | 1/1998 | Treutler et al. .......... 73/204.26 |

FOREIGN PATENT DOCUMENTS

| | | |
|---|---|---|
| DE | 29 00 210 | 7/1980 |
| DE | 31 35 793 | 3/1983 |
| DE | 42 19 454 | 12/1993 |
| DE | 196 01 791 | 7/1997 |
| DE | 198 01 484 | 7/1998 |
| EP | 1 031 821 | 8/2000 |

* cited by examiner

Primary Examiner—Edward Lefkowitz
Assistant Examiner—Corey D. Mack
(74) Attorney, Agent, or Firm—Kenyon & Kenyon

(57) ABSTRACT

A sensor chip having at least upstream from the sensor region, at least one potential surface that, by electrical interaction with the contaminants in the flowing medium, prevents precipitation in the sensor region.

22 Claims, 1 Drawing Sheet

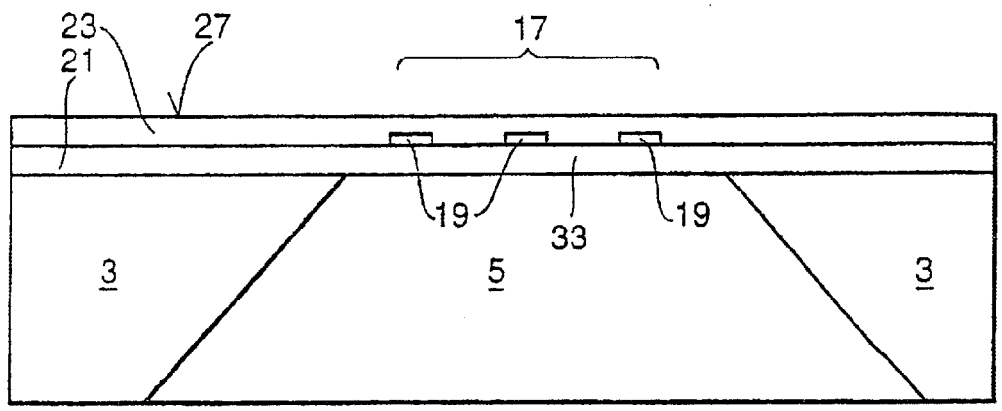
Fig. 1 PRIOR ART
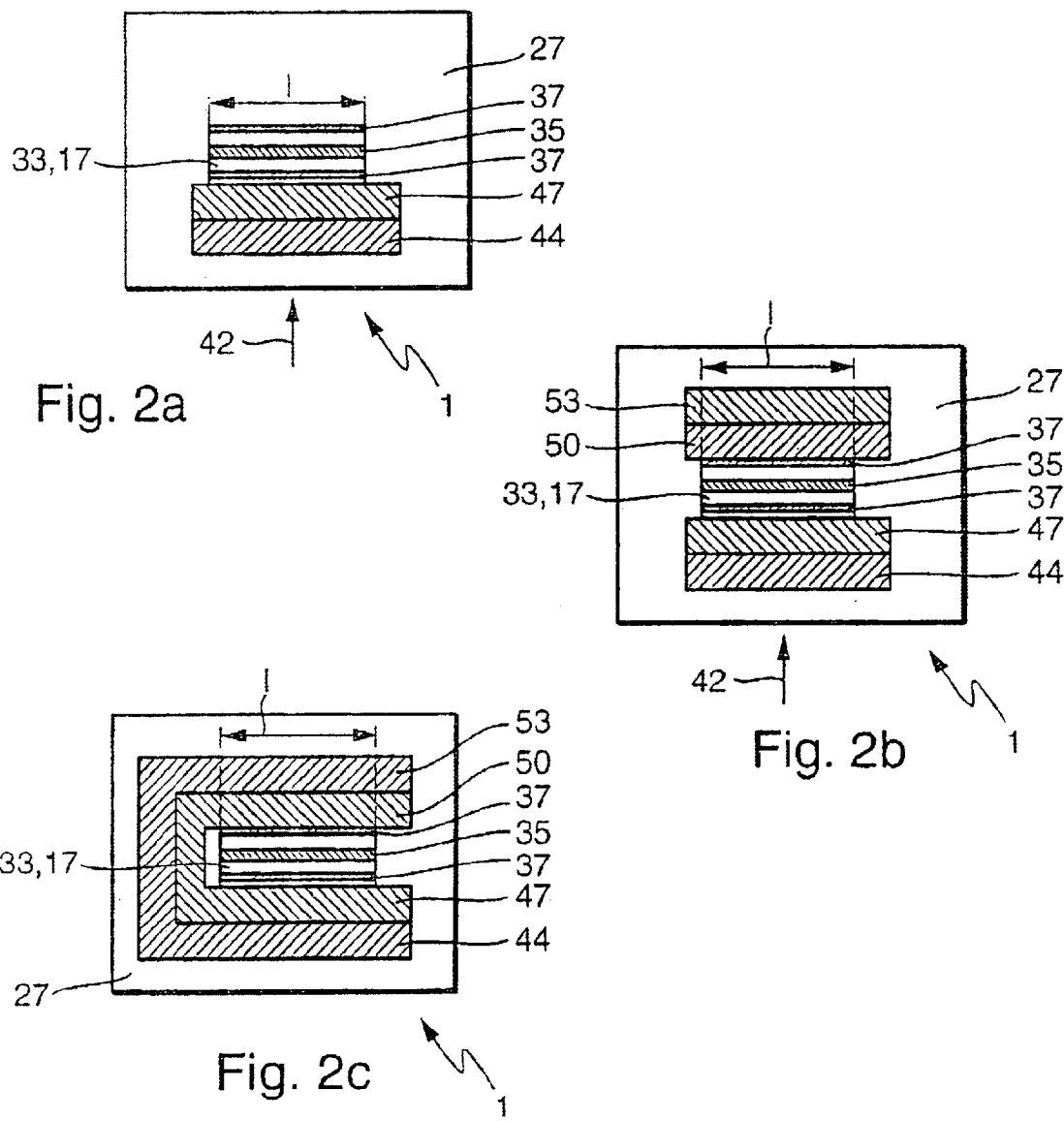
Fig. 2a
Fig. 2b
Fig. 2c

US 6,854,325 B2

SENSOR CHIP HAVING POTENTIAL SURFACES FOR AVOIDING CONTAMINANT

CROSS REFERENCE TO RELATED APPLICATIONS

This case is a 371 of PCT/DE02/01424 filed on Apr. 17, 2002.

FIELD OF THE INVENTION

The present invention relates to a sensor chip having potential surfaces, and from a use of a potential surface on a sensor chip, and from a method for avoiding contaminants on a sensor.

BACKGROUND INFORMATION

German Published Patent Application No. 196 01 791 shows a sensor chip having a sensor region that is made up, for example, of a frame element, a recess, and a membrane that forms a sensor region. Contaminants, for example oil, to which the sensor chip is exposed can at any time result in arm undesirable influence on the measured signal of the sensor chip in the vicinity of the sensor region. Contamination with oil of the sensor region, or in the immediate vicinity around the sensor region, modifies the thermal conductivity on the surface of the sensor chip and thus has a distorting effect on the measured signal. In addition, oil deposited on the sensor chip serves as an adhesion promoter for solid particles contained in a flowing medium. These captured particles in turn additionally enhance the unfavorable influence.

U.S. Pat. No. 5,705,745 describes a sensor chip having a membrane on which temperature resistors and heating resistors are positioned, the membrane being surrounded by a thermal conduction element that can also be U-shaped. The thermal conduction element is not heated, i.e. it has no potential.

U.S. Pat. No. 4,888,988 describes a sensor chip having a membrane, a metallic conductor being positioned around the membrane. This conductor is the common neutral conductor of a measurement assemblage on the sensor chip for a measurement method.

German Published Patent Application No. 198 0 484 describes a sensor chip having a membrane, electrical conductors through which an electrical current flows being positioned around the membrane. These conductor paths are temperature sensors that are used for the measurement method or measurement procedure.

German Published Patent Application No. 29 00 210 and U.S. Pat. No. 4,294,114 describe a sensor chip that has a temperature-dependent resistor on a support, a further resistor that heats the substrate being mounted on the support.

German Published Patent Application No. 42 19 454 and U.S. Pat. No. 5,404,753 describe a sensor chip that has a reference temperature sensor at a distance from a sensor region.

German Published Patent Application No. 31 35 793 and U.S. Pat. No. 4,468,963 describe a sensor chip that has, upstream and/or downstream from the sensor resistor, a further resistor that, however, influences the measured signal.

SUMMARY OF THE INVENTION

The sensor chip according to the present invention having the potential surfaces and the use according to the present invention of potential surfaces on a sensor chip and the method according to the present invention for avoiding contaminants on a sensor chip have, in contrast, the advantage that contamination of the sensor chip is reduced or prevented in a simple fashion.

Advantageously, potential surfaces that protect the sensor region e.g. in the event of backflows are also positioned downstream from the sensor region.

An advantageous potential drop is achieved by way of a positive potential on a first potential surface and a negative potential on a subsequent potential surface.

The potential surfaces advantageously have a U-shape which advantageously surrounds the sensor region.

The potential surfaces are advantageously embodied, like the heating resistors, as a conductor path, since this is a known and simple manufacturing method.

The sensor region is advantageously operated independently of the potential surfaces, i.e. the measurement or the measured signal supplied by the sensor region is not influenced by operation of the potential surfaces, and vice versa.

BRIEF DESCRIPTION OF THE DRAWINGS

FIG. 1 shows a sensor chip according to the existing art.

FIG. 2a shows a first exemplified embodiment of a sensor chip according to the present invention.

FIG. 2b shows a second exemplified embodiment of a sensor chip according to the present invention.

FIG. 2c shows a third exemplified embodiment of a sensor chip according to the present invention.

DETAILED DESCRIPTION

FIG. 1 shows a sensor chip according to the existing art that is improved according to the present invention in accordance with the remarks referring to FIGS. 2a through 2c. The manufacturing method and application of such a sensor chip are described in more detail in German Published Patent Application No. 196 01 791, the content of which is explicitly intended to be part of this disclosure.

The sensor chip has a frame element 3 that is made, for example, of silicon. Frame element 3 has a recess 5. Mounted on the frame element is, for example, a dielectric layer 21 made e.g. of $SiO_2$. Layer 21 can extend over the entire frame element 3, but also over only a region of recess 5. This region constitutes a membrane 33 that partially or entirely delimits recess 5 on one side. Mounted on the side of membrane 33 facing away from recess 5 are at least one, for example three, metal paths 19. Metal paths 19 constitute e.g. electrical heaters and/or measurement resistors, and with membrane 33 constitute a sensor region 17. At least sensor region 17 is preferably covered with a protective layer 23. Protective layer 23 can also extend only over metal paths 19.

The sensor chip has a surface 27 that is in direct contact with a flowing medium.

FIG. 2a shows, in a plan view, a first exemplary embodiment of a sensor chip 1 configured in accordance with the present invention.

Positioned on sensor region 17 are e.g. metal paths that, for example, constitute at least one electrical heating resistor 35 and at least one temperature sensor 37. Temperature sensor 37 is e.g. also an electrical resistor. In this case there are two temperature sensors 37 and one temperature resistor 35 which are positioned predominantly parallel to one another, temperature sensors 37 running to the left and right of heating resistor 35. The metal paths are positioned for the most part in sensor region 17 and are the prerequisite for a measurement method for determining the at least one parameter, for example the temperature and/or flow volume, of the flowing medium. Sensor region 17 is therefore connected to a known monitoring and control circuit (not depicted). Sensor region 17 can be constituted, for example, by membrane 33 described above.

Sensor chip 1 is positioned in a flowing medium for determination of at least one parameter, the flowing medium flowing, in a main flow direction 42, past or over sensor chip 1 and surface 27. The flowing medium can contain impurities that result in contamination of sensor chip 1. These are e.g. oil, or salts dissolved in water. In order to avoid or reduce contamination, a first 44 and a second 47 potential surface are positioned in front of sensor region 17 in main flow direction 42. First potential surface 44 has, for example, a positive potential of 1 volt that derives e.g. from a voltage source independent of the monitoring and control circuit. Second potential surface 47 has no potential or a negative potential. The potential drop can be of any magnitude, and can also be configured in reverse.

The electrical interaction of the potential surfaces with the liquid and contaminant particles that are contained in the flowing medium results in a prevention of deposition in sensor region 17, since the contaminant particles are repelled by the electric field of the applied voltage and thus deflected around sensor region 17. This happens when the potential of the potential surfaces and the charge of the liquid and contaminant particles are similarly charged, i.e. either both positive or both negative.

If the potential of the potential surfaces and the charge of the liquid and contaminant particles are opposite, i.e. the potential is positive and the liquid and contaminant particles negative, or vice versa, the liquid and contaminant particles are attracted to surface 27 and are intentionally deposited in the region of the potential surfaces, but not in sensor region 17. Electrostatic fields are preferably used. Alternating fields can, however, also be applied.

FIG. 2b shows a second exemplary embodiment of a sensor chip 1 embodied according to the present invention. Sensor chip 1 additionally has, downstream in sensor region 17, a third 50 and a fourth 53 potential surface. First potential surface 44 is e.g. at the same potential as fourth potential surface 53, and second 47 and third 50 potential surface also have, for example, the same potential. Contamination in sensor region 17 is thus also avoided in the presence of backflows, for example due to pulsations, that may occur opposite to main flow direction 42. Potential surfaces 44, 47, 50, 53 upstream and downstream of sensor region 17 do not necessarily need to have an identical potential difference.

FIG. 2c shows a third exemplary embodiment of a sensor chip 1 embodied according to the present invention. Potential surfaces 44, 47, 50, 53 each constitute parts of a U-shape that at least partially surrounds sensor region 17. Proceeding from FIG. 2b, therefore, second and third potential surfaces 47, 50 are connected to one another, and first potential surface 44 to fourth potential surface 53, which then constitute one potential surface.

The following description furthermore applies to all the exemplified embodiments.

Sensor chip 1 is, for example, of plate-shaped configuration and has surface 27 past which the flowing medium flows. Sensor region 17 and potential surfaces 44, 47, 50, 53 are arranged, for example, together on surface 27.

Potential surfaces 44, 47, 50, 53 are, for example, embodied in such a way that they have a length, at least upstream or downstream from sensor region 17, which is longer than a length l of sensor region 17 transverse to main flow direction 42. Sensor region 17 is thereby protected from contamination over its entire length l.

Resistors 35, 37 and/or potential surfaces 44, 47, 50, 53 are preferably embodied as conductor paths.

Potential surfaces 44, 47, 50, 53 can be positioned entirely or partially on sensor region 17, directly adjacent to sensor region 17 or at a distance from sensor region 17.

Sensor region 17 can be operated independently of potential surfaces 44, 47, 50, 53, i.e. the measurement or measured signal that sensor region 17 supplies is not influenced by the operation of potential surfaces 44, 47, 50, 53. The monitoring and control circuit of sensor region 17 can send signals to potential surfaces 44, 47, 50, 53, for example can apply a specific voltage or switch off a voltage, but potential surfaces 44, 47, 50, 53 are not part of the measurement or control loop of sensor region 17. The magnitude of the applied voltage can be varied.

The potential of potential surfaces 44, 47, 50, 53 can also be defined already at the design stage, so that no control circuit is required for them in order to establish a specific potential, which is then defined for the entire service life of the sensor chip.

What is claimed is:

1. A sensor chip for measuring at least one parameter of a flowing medium having a main flow direction, comprising:
   a sensor region for performing at least one measurement operation; and
   at least one potential surface positioned at least partially upstream in front of the sensor region on the sensor chip,
   wherein the at least one potential surface is connected to a low-voltage source; and wherein the at least one potential surface is arranged to generate, by way of an applied electric voltage, an electric field to deflect or attract entrained particles of the flowing medium around the sensor region.

2. The sensor chip as recited in claim 1, further comprising:
   at least one further potential surface positioned downstream behind the sensor region on the sensor chip.

3. The sensor chip as recited in claim 1, wherein:
   the at least one potential surface is positioned at a distance from the sensor region.

4. The sensor chip as recited in claim 1, wherein:
   a first one of the at least one potential surface has a positive electrical potential, another one of the at least one potential surface that is directly adjacent to the first one of the at least one potential surface has no potential or a negative potential, and the first one of the at least one potential surface and the other one of the at least one potential surface are positioned in front of the sensor region or behind the sensor region in the main flow direction.

5. The sensor chip as recited in claim 1, wherein:
   the at least one potential surface has a U-shape.

6. The sensor chip as recited in claim 1, wherein:
   the sensor region includes a membrane.

7. The sensor chip as recited in claim 1, wherein the sensor region includes:
   at least one heating resistor, and
   at least one temperature sensor.

8. The sensor chip as recited in claim 7, wherein:
the at least one heating resistor and the at least one temperature sensor include conductor paths.

9. The sensor chip as recited in claim 1, wherein:
the sensor region has a length transverse to the main flow direction, and
the at least one potential surface is positioned transversely to the main flow direction and is longer than the length of the sensor region transverse to the main flow direction.

10. The sensor chip as recited in claim 1, wherein:
the at least one potential surface includes a conductor path.

11. The sensor chip as recited in claim 1, further comprising:
at least one surface past which the flowing medium flows, wherein:
the sensor region and the at least one potential surface are positioned together on the at least one surface past which the flowing medium flows.

12. The sensor chip as recited in claim 1, wherein:
the sensor region is electrically operated independently of the at least one potential surface.

13. The sensor chip as recited in claim 7, wherein the at least one temperature sensor is an electrical resistor.

14. A method of using at least one potential surface to deflect entrained particles of a flowing medium in a vicinity of a sensor region in accordance with an electric field, comprising:
positioning the at least one potential surface on a sensor chip for determining at least one parameter of the flowing medium; and causing the at least one potential surface to generate, by way of an applied electrical voltage, the electric field that deflects the entrained particles of the flowing medium around the sensor region.

15. The method as recited in claim 14, wherein the at least one parameter is at least one of a temperature and a flow volume.

16. The method as recited in claim 14, wherein the at least one potential surface is connected to a low-voltage source.

17. A method for avoiding contamination on a sensor chip that has a sensor region and is positioned in a flowing medium, comprising:
causing at least one potential surface to generate, by way of an applied electrical voltage, an electric field that deflects entrained particles of the flowing medium around the sensor region.

18. The method as recited in claim 17, wherein the electric field is an electrostatic field.

19. The method as recited in claim 17, wherein the electric field is an alternating field.

20. The method as recited in claim 17, wherein the at least one potential surface is connected to a low-voltage source.

21. A method for avoiding contamination on a sensor chip that has a sensor region and is arranged in a flowing medium, comprising:

causing at least one potential surface to generate, by way of an applied electrical voltage, an electric field that attracts entrained particles of the flowing medium one of upstream and downstream from the sensor region in a region of the at least one potential surface.

22. The method as recited in claim 21, wherein the at least one potential surface is connected to a low-voltage source.

* * * * *

UNITED STATES PATENT AND TRADEMARK OFFICE
CERTIFICATE OF CORRECTION

PATENT NO.     : 6,854,325 B2
DATED          : February 15, 2005
INVENTOR(S)    : Uwe Konzelmann et al.

It is certified that error appears in the above-identified patent and that said Letters Patent is hereby corrected as shown below:

Column 1,
Line 23, change "arm undesirable influence" to -- an undesirable influence --

Signed and Sealed this

Thirty-first Day of May, 2005

JON W. DUDAS
*Director of the United States Patent and Trademark Office*